United States Patent [19]

Tanaka

[11] 4,194,942

[45] Mar. 25, 1980

[54] APPARATUS FOR MANUFACTURING SYNTHETIC RESIN HOSE HAVING A REINFORCING MEMBER EMBEDDED THEREIN

[75] Inventor: Kenichi Tanaka, Musashino, Japan

[73] Assignee: Kakuichi Co. Ltd., Nagano, Japan

[21] Appl. No.: 902,825

[22] Filed: May 4, 1978

[30] Foreign Application Priority Data

Oct. 15, 1977 [JP] Japan .................................. 52-122967

[51] Int. Cl.$^2$ ................................................ B29D 23/05
[52] U.S. Cl. ....................................... 156/433; 156/149; 156/244.13; 156/244.15; 156/441; 156/498; 156/499; 156/500; 425/133.1; 425/516
[58] Field of Search ................... 156/149, 244.13, 433, 156/498, 499, 500, 441, 244.15; 425/113, 133.1, 516; 138/123, 172

[56] References Cited

U.S. PATENT DOCUMENTS

| | | | |
|---|---|---|---|
| 459,536 | 9/1891 | Simons | 156/149 |
| 3,007,497 | 11/1961 | Shobert | 156/149 |
| 3,038,523 | 6/1962 | Merck et al. | 425/516 |
| 3,437,537 | 4/1969 | Takada | 156/500 |

*Primary Examiner*—Caleb Weston

*Attorney, Agent, or Firm*—Stevens, Davis, Miller & Mosher

[57] ABSTRACT

There is disclosed an apparatus for manufacturing a synthetic resin hose having a tubular reinforcing member embedded therein, which comprises a hollow cylindrical member having diameter adjusting discs provided with yarn guide holes for guiding a plurality of bonding-agent applied warps to the outer peripheral surface of the hollow cylindrical member, and an adjusting disc for guiding braiding yarns to the outer peripheral surface of a tubular member formed by said plurality of warps; a braiding machine surrounding said hollow cylindrical member and weaving the braiding yarns into a braided member; a first heating unit surrounding said hollow cylindrical member and bonding the warp tubular member to the braided member at the contacts therebetween, thereby heat-setting a tubular reinforcing member consisting of the warp tubular member and the braided member; a resin applying unit having manifolds and die for coating synthetic resin to the inner and outer peripheral surfaces of said tubular reinforcing member; a second heating unit for gelation of synthetic resin coated to said reinforcing member; and a cooling unit for air-cooling a composite tubular body thus formed; said member, said machine and said units being arranged in the order described succeedingly from below of the hollow cylindrical member.

2 Claims, 10 Drawing Figures

APPARATUS FOR MANUFACTURING SYNTHETIC RESIN HOSE HAVING A REINFORCING MEMBER EMBEDDED THEREIN

BACKGROUND OF THE INVENTION

This invention relates to a process and apparatus for continuously manufacturing a synthetic resin hose having a tubular reinforcing member embedded therein, wherein the reinforcing tubular member consists of a warp tubular member and a braided member, the warp tubular member being formed by a plurality of warps applied with a bonding agent and arranged circularly in cross section, and the braided member being formed by braiding yarns woven in overlying fashion on the outer peripheral surface of the warp tubular member, the warps and braided yarns being bonded together at the contacts therebetween, whereby a synthetic resin hose having a highly improved quality is continuously obtained.

A synthetic resin hose having a tubular reinforcing member embedded therein has heretofore been prepared by maintaining the reinforcing member woven or braided beforehand in a tubular shape by various means and by coating synthetic resin onto the inner and outer peripheral surfaces of the prefabricated tubular reinforcing member. With such a process, a weaving or braiding step must be provided separately; and a reinforcing member must be prepared at a given length in advance as well as manufactured one by one, thus resulting in the failure of producing standardized products having a constant quality which meet the industrial standard, as well as resulting in poor economy. For the realization of the continuous manufacture of such a synthetic resin hose having an embedded reinforcing member, a process has recently been proposed by Japanese Laid-open Patent No. 126,774/75, wherein braiding yarns are woven into a tubular shape continuously on a mandrel; the layer of braid thus formed is maintained in the tubular shape by core yarns (warps) which are filled in meshes between woven yarns and maintained tightly in its weaving direction; and then synthetic resin is continuously coated onto the tubular woven member. A difficulty confronts with such a process that the number of warps cannot be determined independent of the number of braiding yarns, but usually must be less than one-half of the total numbers of braiding yarns, leading to the impossibility of formation of a reinforcing member having a right circular cross section. Another drawback is that, due to friction of tight warps relative to woven yarns which occurs at the time of filling warps in the woven yarns, non-uniformity in tension of braiding yarns is caused, with a likelihood of causing irregularity in meshes of woven yarns as well as break of yarns.

An object of the present invention is to provide a process for continuously manufacturing a long hose having an embedded reinforcing member, which is highly stabilized in size, with the freedom of the above-described drawbacks. To attain the object according to the present invention, there is provided a process for continuously manufacturing a synthetic resin hose having a reinforcing member embedded therein, which comprises the steps of; forming a reinforcing member consisting of a warp tubular member and a braided member, the warp tubular member being formed by guiding a plurality of bonding-agent applied warps via circularly provided yarn guide holes to the outer peripheral surface of a hollow cylindrical member and drawn lengthwise of a hose to be formed, and the braid member being formed by weaving a plurality of braiding yarns around the outer periphery of the warp tubular member; heating the reinforcing member for the bonding of warps to braiding yarns at the contacts therebetween, thereby heat-setting the reinforcing member; cooling the heat-set reinforcing member and guiding the same to a synthetic resin applying unit for coating synthetic resin onto the inner and outer surfaces of the tubular reinforcing member; heating the resin-coated reinforcing tubular member for gelatinizing the synthetic resin; and drawing and taking up a composite tubular member while cooling the same.

Another object of the present invention is to provide an apparatus embodying the above-described process which comprises; a hollow cylindrical member having diameter adjusting discs provided with a number of yarn guide holes, respectively, for guiding a plurality of warps, to which a bonding agent has been applied, to the outer peripheral surface of the hollow cylindrical member, and an adjusting disc for guiding braiding yarns, the hollow cylindrical member guiding the plurality of warps in the longitudinal axial direction thereof, thereby forming a warp tubular member; a braiding machine disposed around the hollow cylindrical member and weaving braiding yarns into a braid member on the outer peripheral surface of the warp tubular member; a first heating unit surrounding the hollow cylindrical member and heating the reinforcing member consisting of the warp tubular member and braid member for the bonding yarns of these members at the contacts therebetween, thereby heat-setting the reinforcing member; a resin applying unit including manifolds and a die for coating synthetic resin to the inner and outer peripheral surfaces of the reinforcing tubular member; a second heating unit for gelatinizing synthetic resin coated onto the reinforcing tubular member; and a cooling unit for cooling the hose thus molded, the aforesaid members and units being disposed in the order described succeedingly from below of the apparatus.

These and other objects and features of the present invention will be apparent from the ensuing part of the specification in conjunction with drawings which indicate preferred embodiments of the invention.

DESCRIPTION OF PREFERRED EMBODIMENTS

Figure 1:
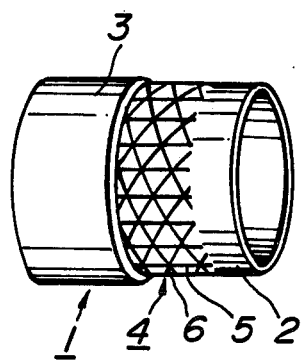
FIG. 1 is a perspective view of a synthetic resin hose according to the present invention.
Figure 2:
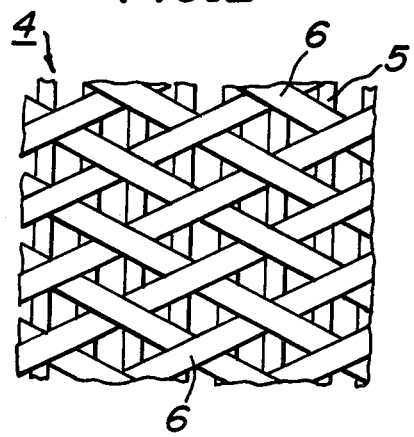
FIG. 2 is a fragmentary developed view of a reinforcing member for synthetic resin hose.
Figure 3:
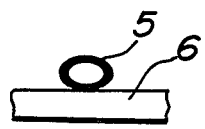
FIG. 3 illustrates the condition of bonding between the reinforcing yarns.

FIG. 1 typically shows a synthetic resin hose or tubing structure according to the present invention. A synthetic resin hose 1 consists of an inner layer 2 and outer layer 3, both of which may be made of soft polyvinyl chloride, and a reinforcing member 4 which may be formed of filaments of a polyester. Reinforcing member 4 consists of a plurality of warps 5 drawn lengthwise of the hose on the outer peripheral surface of inner layer 2 and arranged mutually in side by side relation in annulus in cross section to thereby be formed into a tubular shape, and braiding yarns 6 woven into a braid member in a manner to incline respective yarns positively and negatively with respect to the longitudinal axis of the hose around the outer periphery of the warp tubular member. Inner layer 2 and outer layer 3 are bonded together through the meshes of woven yarns of reinforcing member 4 into an integral body. As it is obvious from FIG. 2 wherein fragmentary reinforcing member 4 is shown in development, one braiding yarn inclined left-end down and another braiding yarn inclined right-end down are alternately woven, independently of warps 5, and bonded to respective warps 5 in an overlying fashion. The bonding of warps to the woven yarns is accomplished by a bonding agent applied to the warps beforehand, in the manner shown in FIG. 3.

The synthetic resin hose according to the present invention is produced by the following steps.

(1) Warp treating step:

This step is to guide a plurality of warps 5 paid off from a plurality of creels in tension by means of guide rollers into a bonding agent tub 14, thereby applying the bonding agent to respective warps 5.

The bonding agent used herein is preferably a solution of synthetic resin material or an emulsion of synthetic resin. The most importance to such a bonding agent is to provide a firm, storing and flexible bonding of the bonding-agent applied warps to woven yarns.

(2) Braiding step:

At this step, bonding-agent applied warps 5 are guided in alignment in the circular shape in cross section by means of a diameter adjusting disc 27 provided with yarn guide holes 29 to the outer periphery surface of a hollow cylindrical member 25 and stretched in the longitudinal axial direction of a hose to be formed, to thereby be formed into a warp tubular member, and while the warp tubular member is being moved upwards, a plurality of braiding yarns 6 are woven consecutively in overlying relation around the outer peripheral surface of the warp tubular member into a braid member, whereby a tubular reinforcing member to be embedded in synthetic resin hole 1 is prepared.

At this step, owing to the fact that the braid members formed on the outer periphery of the bonding-agent applied warp tubular member by maintaining braiding yarns in a given tension with respect thereto are bonded to the bonding-agent applied warp tubular member with a bonding force proper but smaller than that to be provided in a succeeding step, the braiding progresses in synchronism with the upward movement of the warp tubular member, allowing the smooth and continuous braiding of yarns. In the absence of a bonding agent, the braid members would be separated, which results in the failure of movement of the braid member in synchronism with the movement of the warp tubular member. Since, according to the present invention, the warp tubular member is drawn under guidance of the hollow cylindrical member, the braid member can be manufactured with any one of the directions of braiding yarns of being woven, for example, upwards, downwards or in the horizontal direction.

(3) Step of heat-setting reinforcing member:

In the course of the upwardly moving reinforcing member prepared in the preceding step is disposed a heating unit 41 surrounding the reinforcing member so as to heat the same for providing an increased bonding of warps 5 to woven yarns 6 at the contacts therebetween, thereby heat-setting the reinforcing member. A temperature at this heating unit is largely dependent on material which is used for the reinforcing member, but should be at least higher than a temperature at which moisture in the reinforcing material is evaporated, and lower than a softening point of the reinforcing material. The heating time is approximately in the range of 30 to 90 seconds.

(4) Step of coating layers of synthetic resin:

At this step, the heat-set reinforcing member is subjected to cooling during the upward movement, and guided to a synthetic resin applying unit 43, by which layers of synthetic resin are coated onto the inner and outer peripheral surfaces of reinforcing member, respectively, thereby producing a composite tubular structure.

(5) Heating step:

At this step, the layers of synthetic resin coated onto the inner and outer peripheral surfaces of reinforcing member is subjected to heating for gelatinization.

(6) Cooling step:

At this step, the composite tubular structure is subjected to cooling for solidification, thereby being produced as a finished synthetic resin hose.

(7) Taking-up step:

The length of synthetic resin hose is taken up to a winding reel under a constant tension successively.

Figure 4:
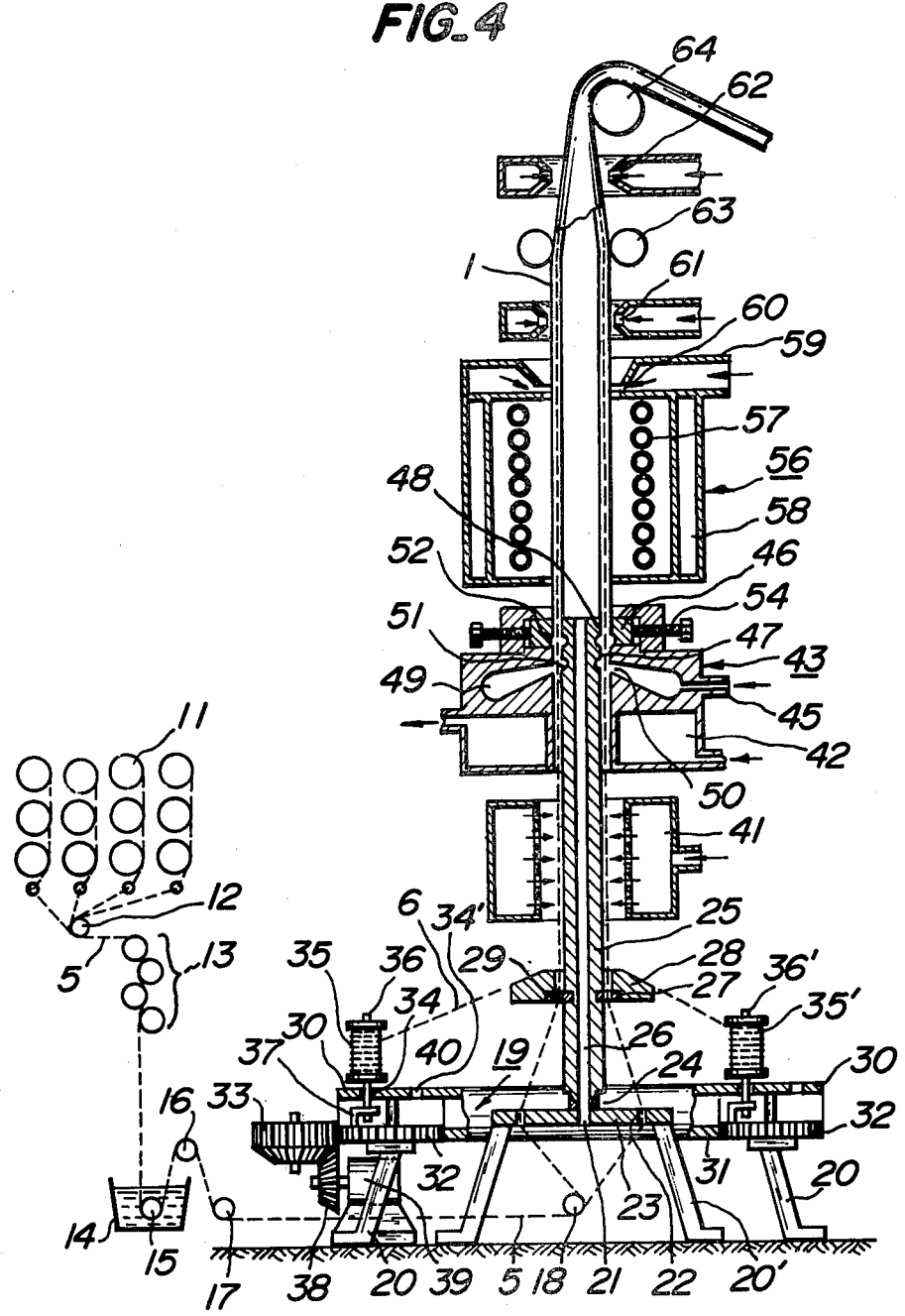
FIG. 4 illustrates of an apparatus for manufacturing a synthetic resin hose, shown as a first embodiment of the present invention.
Figure 5:
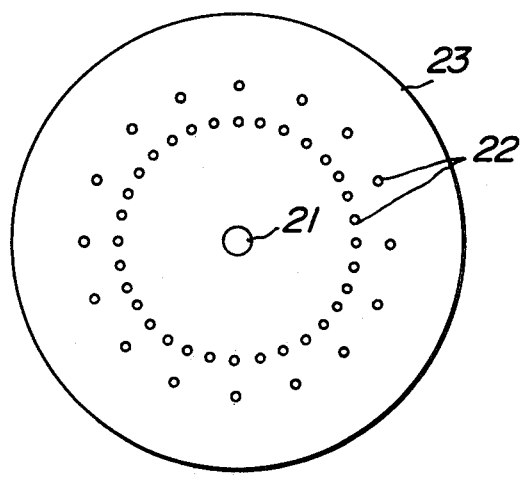
FIGS. 5 and 6 are plan views in an enlarged scale of a first diameter adjusting disc and a second diameter adjusting disc, respectively.
Figure 6:
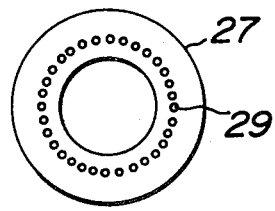

FIGS. 4 through 6 are explanatory views of an apparatus for continuously manufacturing a synthetic resin hose according to the above-described steps.

Referring first to FIG. 4, shown at 11 are bobbin creels serving as spools for warps 5. The bobbins equal in number to the number of warps required are prepared and mounted on shafts of spools, respectively. Warps paid-off from bobbin creels 11 are guided to a bonding-agent tub 14, while being maintained in a given tension by means of a guide roller 12, tension rollers 13 and a guide roller 15 disposed in bonding-agent tub 14, so that the bonding agent is applied to respective warps 5. The bonding-agent applied warps 5 are transported by way of guide rollers 16, 17 and 18 to the lower portion of a braiding machine body 19. Braiding machine 19 is supported by legs 20 and includes a first diameter adjusting disc 23 having a central opening 21 and yarn guide holes 22. First diameter adjusting disc 23 is provided for arranging warps 5 in the tubular shape so as to prevent an unwanted adhesion or jamming between or among the bonding-agent applied warps, and has central opening 21 and warp guide holes 22 provided concentrically therewith at an equi-angular spacing from one another, as best seen in FIG. 5.

Figure 7:
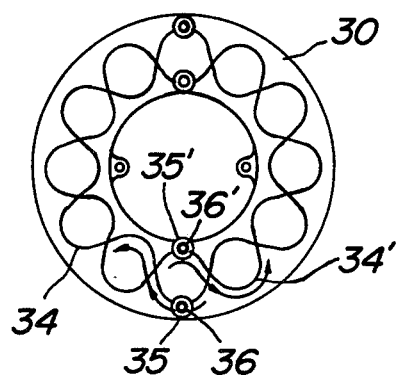
FIG. 7 is a plan view of a top disc of a braiding machine, for illustrating guide slots for braiding yarn bobbins.

A vertical, hollow cylindrical member 25 for guiding the warps is coupled by means of hollow coupling pin 24 to first diameter adjusting disc 23 and supported upright by the disc. A second diameter adjusting disc 27 integral with an adjusting disc 28 is fitted over hollow cylindrical member 25 in an upper appropriate portion thereof. Second diameter adjusting disc 27, as is obvious from FIG. 6, has a number of warp guide holes 29 spaced apart at an equi-angular relation from one another along the circumference of an opening having a diameter substantially corresponding to a desired diameter of a tubular member being formed. The disc 27 is provided for constricting warps arranged in the tubular shape after having passed through guide holes 22 in first diameter adjusting disc 23 to a desired diameter of a product being formed, as well as for guiding the same along the outer peripheral surface of hollow cylindrical member 25. Adjusting disc 28 serves to make uniform a tension of the plurality of braiding yarns 6 and to guide braiding yarns 6 to the outer peripheral surface of the warp tubular member, so as to provide a braid member having regular meshes. A braiding mechanism of braiding machine 19 includes a plurality of gears 32 for shifting braiding-yarn bobbins, which are disposed mutually in meshing relation to a planetary fashion between top disc 30 and a bottom disc 31, both of which are supported by legs 20; and a drive gear 33 engaging gear 32. Shafts 36 and 36' of at least a pair of braiding-yarn bobbins 35 and 35' are fitted in two endless guide slots 34 and 34' provided in the top disc 30 in a manner to meander alternately radially inwards and outwards. These shafts are in engagement with engaging portions 37 upright from gears 32, so that the plurality of braiding-yarn bobbins 35 and 35' effect a circular meandering motion (i.e. braider motion) along endless guide slots 34 and 34' around hollow cylindrical member 25, while assuming radially inner and outer positions alternately, whereby the pair of bobbins revolve around the warp tubular member formed along the outer periphery of hollow cylindrical member 25, thereby forming a braided member. Shown at 38 is a drive gear which engages drive gear 33, and shown at 39 is a motor. FIG. 7 illustrates two endless guide slots 34 and 34' provided in the meandering manner in top disc 30. A braid member is formed in the following manner. Shafts 36 and 36' of at least a pair of braiding-yarn bobbins 35 and 35' are fitted in endless guide slots 34 and 34', and with revolution of planetary gears 32, these bobbins are caused to revolve, through engagement of their shafts with engaging portions 37 projecting from planetary gears 32, along endless guide slots 34 and 34' mutually in opposite directions at the same speed, while changing the engagement of bobbin shafts with the engaging portions of planetary gears from one to another at a crossing of two endless guide slots, whereby the braiding motion is accomplished.

Figure 8:
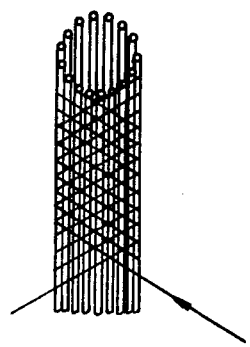
FIG. 8 is a perspective view of a reinforcing tubular member formed according to the process of the present invention, wherein braiding yarns are woven around the warp tubular member.

In braiding machine body 19 so far described, when bonding-agent applied warps 5 have passed through yarn guide holes 22 circularly provided in first diameter adjusting disc 23 as well as yarn guide holes 29 in second diameter adjusting disc 27, then these warps are guided towards the axis of hollow cylindrical member 25 on the surface of the outer peripheral wall thereof along the outer peripheral wall, thereby being formed into a tubular shape around hollow cylindrical member 25 serving as a core body, as shown in FIG. 8. More specifically, there is formed a tubular member, in which warps 5 are maintained in tight under a given tension and arranged mutually in side-by-side relation into a circular shape in cross section around hollow cylindrical member 25, with their inner surfaces held by the outer peripheral wall of hollow cylindrical member 25. Since braiding yarns 6 are woven in overlying fashion on the outer periphery of warp tubular member, independently of respective warps, there is no likelihood of causing friction of braiding yarns relative to warps, and hence non-uniformity in tension of braiding yarns 6, which might cause irregularity in meshes between woven yarns or break of braiding yarns. Braiding yarns 6, as described above, are woven into a tubular shape on the outer periphery of warp tubular member, thus overlying the warp tubular member through the medially of the bonding agent. With this condition maintained intact, the two tubular members will be guided to first heating unit 41, so as to provide the firm bonding of warps 5 to braided yarns 6 at the contacts therebetween, to thereby heat-set the reinforcing member consisting of warp tubular member and braid member. The reinforcing member will be then moved to the succeeding cooling unit 42 for being cooled, and further transported to a resin applying unit 43, by which layers of synthetic resin are coated to the inner and outer peripheral surfaces of the reinforcing member. With a view of achieving the above steps, around hollow cylindrical member 25 are disposed first heating unit 41, cooling unit 42 and resin applying unit 43 in the order described succeedingly from below of the cylinder. Hollow cylindrical member 25 should have a length of at least long enough to complete the coating of synthetic resin to the inner and outer surfaces of the reinforcing member.

The hose coated with resin is transported to second heating unit 56 for gelation of the resin, then subjected to cooling for solidification of resin, and then taken up to a proper reel.

Figure 9:
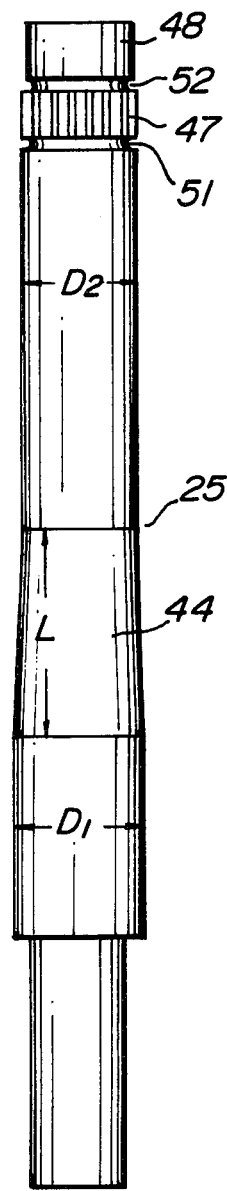
FIG. 9 is an enlarged front view of a hollow cylindrical member.

Hollow cylindrical member 25 as illustrated in FIG. 9 are open at the top and bottom ends, tapered upwards in a portion surrounded by first heating unit 41, and has a grooved portion 47 and a diametrically small portion 48 in the portion surrounded by resin supplying unit 43. The use of the "hollow" cylinder arises from the necessity of discharging the surplus of high temperature gases generating at the time of gelation of a synthetic resin material of a synthetic resin hose by the heating in second heating unit 56 although such high temperature gases act to maintain the synthetic resin hose in the tubular shape. The degree of taper in the tapered portion 44 of hollow cylindrical member is properly determined, depending on a shrinkage percentage of braiding yarns 6 used, which suffer thermal shrinkage during the passage through first heating unit 41. Thus, the tapered portion 44 ensures the smooth upward movement of braiding yarns 6 along hollow cylindrical member 25.

First heating unit 41 is so arranged as to feed hot blast from a blower (not shown), so as to heat the surface of hollow cylindrical member 25, whereas warps 5 and braided yarns both in the tubular shape are heated from the inner and outer surfaces thereof. The primary heating is effected for the following purposes and provides the following effects.

(1) Evaporation of moisture contained in warps 5 and woven yarns 6 to perfection, for preventing formation of a pinhole in a product.

(2) To provide an increased bonding force at the contacts between the bonding-agent applied warps 5 and braided yarns 6.

(3) Since the heating is effected at a temperature lower than a softening point of warps 5 and braiding yarns 6 but higher than a heating temperature in second heating unit 56, the thermal shrinkage of respective yarns to a given percentage which is determined by a temperature at the first heating is achieved, as the reinforcing member is maintained tight on the outer peripheral surface of hollow cylindrical member 25. Owing to the effect of thermal shrinkage treatment in the first heating unit, the reinforcing member suffers no thermal shrinkage when passing through second heating unit 56. This ensures production of a hose highly stabilized and uniform in size, with the freedom of internal distortion. A further advantage of the first heating is that the sizes of resin treating unit 43 and grooved portion 47 and diametrically small portion 48 of hollow cylindrical member 25 surrounded by the resin processing unit may be maintained constant with respect to a diameter of a hose being produced, and braiding yarns 6 different in thermal shrinkage percentage may be treated in the same die. The latter is particularly advantageous from the viewpoint of die maintenance.

Cooling unit 42 is a jacket, through which a cooling water is free to flow, and which is attached to the bottom portion of resin processing unit 43 integrally therewith. Cooling unit 42 is provided for cooling the peripheral surface of hollow cylindrical member 25, so as to prevent the over-heating of a synthetic resin material due to thermal conduction of hollow cylindrical member 25 and the resultant untimely gelation of synthetic resin material, and at the same time, for cooling the reinforcing member for strengthening the bonding between yarns.

Resin processing unit 45 is disposed on the top of cooling unit 42 and connected by way of a pipe 45 to an external source for supplying a synthetic resin material (not shown). A synthetic resin material is injected under pressure from the material supply source into an annular manifold 49, then extruded through a nozzle 50, hence introduced past meshes between yarns of the tubular reinforcing member into a manifold 51, and forced upwards through grooves 47. Adjoining to the top ends of respective grooves 47 is a manifold 52, into which the inner and outer synthetic resin material is once collected, and thereafter is injected into a die 46 and diametrically small portion 48, which are positioned above the manifold 52. The filling under pressure of synthetic resin material facilitates permeation of the synthetic resin into the inner and outer peripheral surfaces of the tubular reinforcing member, having no likelihood of creating any pinhole in a hose produced.

The thickness of the inner and outer layers of synthetic resin hose may be set to a proper value by diametrically small portion 48 in the upper portion of hollow cylindrical member 25 and die 46 opposing to the portion 48. Variation in thickness of outer layer may be adjusted by properly moving the die 46 by means of an adjusting screw 54.

Second heating unit 56 involes therein a cylindrical electric heater 57 surrounding the passage of a synthetic resin hose and is thermally insulated at the outer periphery thereof by means of a heat insulating material 58. Disposed in the upper portion of second heating unit 56 is a blocking unit 59 having an annular injection port 60, through which air is injected into the interior, so as to prevent escape of the air heated by second heating unit to the exterior. During the passing of the synthetic resin hose through second heating unit 56, gelation of the synthetic resin is completed due to the heating. Cooling air nozzles 61 and 62 are disposed above second heating unit 56, so as to cool the synthetic resin hose whose gelation has completed. Oscillation-preventive rolls 63 are disposed between the upper and lower nozzles 61 and 62 in contacting relation to the outer peripheral wall of the synthetic resin hose 1 thus formed. Synthetic resin hose 1 is further guided by means of a guide roller 64, drawn under a given tension by means of a pulling machine or drawing machine (not shown) and then taken up to a winding machine (not shown).

In the manufacture of a synthetic resin hose using the apparatus so far described, applicable as a reinforcing material are, besides filaments of a polyester, synthetic fibers of a polyvinyl alcohol, polyamide or polyacryl nitryl; semi-synthetic fibers of such as an acetate; regenerated fibers of such as a cellulose; natural fibers such as cotton; or mixed fibers thereof.

A synthetic resin material herein used is preferably a plastic sole of polyvinyl chloride which is in the form of liquid at room temperature, and in addition, urethane in the form of liquid or rubber in the form of liquid such as nitrile rubber or chloroprene rubber may be employed in accordance with the usage.

Figure 10:
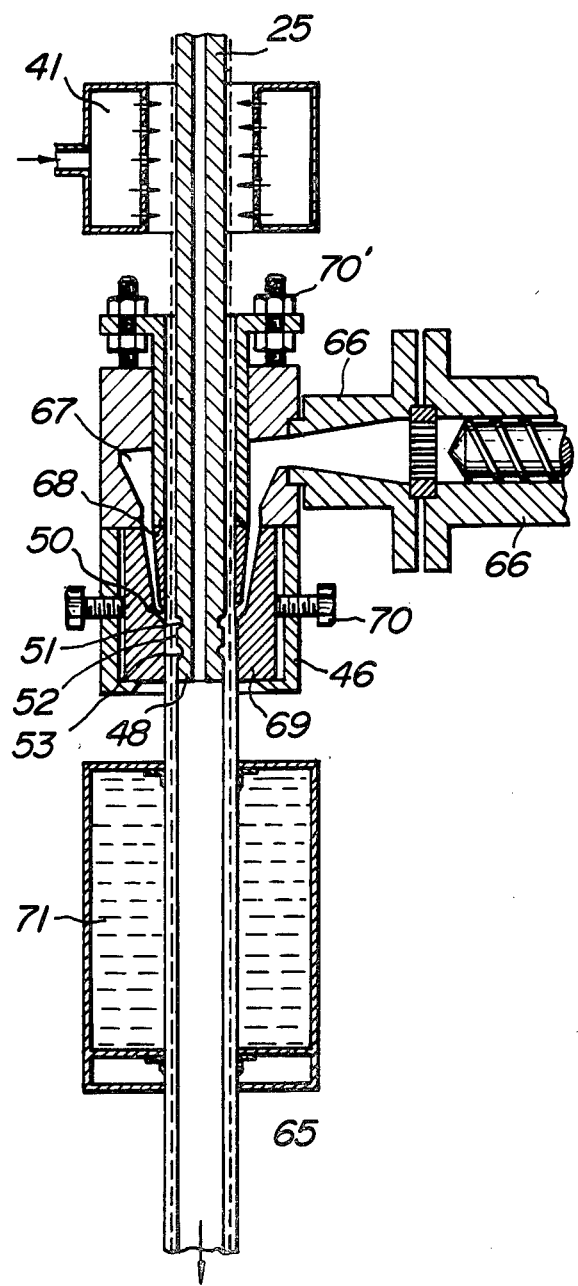
FIG. 10 shows another embodiment of a molding machine which is applicable to the present invention.

In place of resin applying unit 43 shown in FIG. 4, a known extruding machine may be employed, wherein a compound for use in extrusion of synthetic resin, such as polyvinyl chloride, polyethylene or polyurethane, each of which is normally in the granular form, is heated, kneaded and extruded in the fused liquid form from the extruding machine. In such a case, the second heating unit is not needed. FIG. 10 shows an embodiment in which such an extruding machine is used. In this embodiment, a synthetic resin material in the granular form which has been heated, kneaded and fused by the known extruding machine body 66 is extruded and coated to the inner and outer peripheral surfaces of the reinforcing member past first heating unit 41, and the resin-coated reinforcing member is caused to pass through a water tub 71 for being cooled for solidification. Reference numeral 67 denotes a manifold, reference numeral 68 denotes a nozzle, reference numeral 69 denotes a die, and reference numerals 70 and 70' denote adjusting screws.

Examples are given in Table 1 and Table 2.

As an example for comparison, a synthetic resin hose was prepared by using any of filaments A, B and C shown in Table 1, and a bonding agent P and a synthetic resin material Q which are shown below and by treating a reinforcing member at a low temperature. Test results in comparison of other examples with the above-described example are given in Table 2.

Mixture ratios of the bonding agent P and the synthetic resin material Q are as follows.

| Bonding agent P | |
| --- | --- |
| Vinyl chloride resin | 100 parts |
| Plasticizer (di-2-ethyl hexyl phthalate) | 90 parts |
| Stabilizer (an organic tin laurate) | 1 part |
| Synthetic resin material Q | |
| Vinyl chloride resin | 100 parts |
| Plasticizer (di-2-ethyl hexyl phthalate) | 80 parts |
| Stabilization assistant (Epoxidized soybean oil) | 2 parts |
| Stabilizer (Calcium stearate) | 1 part |
| Stabilizer (Zinc stearate) | 1 part |
| Viscosity-increasing agent | Right proportion (3 to 15 parts) |
| Color producing material | Right proportion |

-continued (0.5 to 3 parts)

Table 1

| Kind of fiber | | Softening point (°C.) | Shrinkage percentage due to drying by heating (Temperature × 15 min.) | | | | | |
|---|---|---|---|---|---|---|---|---|
| | | | 120° C. | 140° C. | 160° C. | 180° C. | 200° C. | 220° C. |
| A. Polyester filament | 1000D/1 | 240 | 5.0 | 9.0 | 12.5 | 15.3 | 18.0 | 25.5 |
| B. Polyester filament | 1000D/1 | 240 | 2.5 | 3.0 | 3.6 | 4.2 | 5.0 | 6.3 |
| C. Polyvinyl alcohol filament | 1200D/1 | 225 | 0.5 | 0.6 | 0.8 | 1.0 | 1.3 | 2.0 |

Remarks: B is a heat-set yarn commercially availed.

Table 2(a)

| | | Comparative Example | Example 1 | Example 2 | Example 3 |
|---|---|---|---|---|---|
| 1. Warps | Kind | A | A | B | C |
| | Number of yarns | 60 | 60 | 60 | 60 |
| 2. Braiding yarns | Kind | A | A | B | C |
| | Number of yarns | 36 | 36 | 36 | 36 |
| | Weaving angle (deg) | 70 | 70 | 70 | 70 |
| 3. Bonding agent | | P | P | P | P |
| 4. Synthetic resin material | | Q | Q | Q | Q |
| 5. Size of hollow cylindrical member | $D_1$ (mm$\phi$) | 54.7 | 69.8 | 55.5 | 52.7 |
| | $D_2$ (mm$\phi$) | 52.0 | 52.0 | 52.0 | 52.0 |
| | L (mm) | 100.0 | 200.0 | 100.0 | 100.0 |
| | Tapered | 1/37 | 1/11 | 1/29 | 1/143 |
| 6. Condition of heat treatment | Temperature (°C.) | 120 | 220 | 220 | 200 |
| | Time (sec.) | 45 | 45 | 45 | 45 |

Table 2(b)

| | | Comparative Example | Example 1 | Example 2 | Example 3 |
|---|---|---|---|---|---|
| 7. Heating condition at the time of application of resin | Temperature (°C.) | 180 | 180 | 180 | 180 |
| | Time (min.) | 5 | 5 | 5 | 5 |
| 8. Size of product | Diameter of reinforcing tubular member (mm) | 47.1 | 52.5 | 52.7 | 52.8 |
| 9. Quality, performance of product | | Inner and outer peripheral surfaces were extremely rough due to thermal contraction of reinforcing member. Pinholes were found. | Neat in external appearance and highly improved in resistance to pressure. | Neat in external appearance and highly improved in resistance to pressure. | Neat in external appearance likewise in Examples 1 and 2. Peculiar in performance, depending on a material use for reinforcing member. |

What is claimed is:

1. An apparatus for manufacturing a synthetic resin hose having a tubular reinforcing member embedded therein, comprising:

a plurality of bobbin creels for guiding warp material;

warp treating means for applying a bonding agent to said warp materials by means of a guide roller in a bonding agent tub;

a hollow cylindrical member having diameter adjusting discs provided with yarn guide holes for guiding a plurality of bonding agent bearing warps to the outer peripheral surface of a hollow cylindrical member;

means for guiding warps through said yarn guide holes to the outer peripheral surface of a hollow cylindrical member for forming a tubular member of warps lying parallel to each other parallel to the axis of the tubular member;

a braiding machine surrounding said hollow cylindrical member for weaving braiding yarns into a braided member on the outer periphery of said tubular warp member formed by a plurality of warps guided to the outer peripheral surface of the hollow cylindrical member and mutually aligned in parallel relation to the tubular member;

means for weaving a plurality of braiding yarns into a braid member consecutively in overlying relation around the outer peripheral surface of said warp tubular member thereby preparing a tubular reinforcing member;

a first heating unit surrounding said hollow cylindrical member for bonding the tubular warp member to the braided member at the contacts therebetween for heat-setting a tubular reinforcing member consisting of the warp tubular member and the braided member;

a first cooling unit provided adjacent said first heating unit for solidifying said tubular reinforcing member;

a resin applying unit having a manifold and die for coating synthetic resin onto the inner and outer peripheral surfaces of said tubular reinforcing member;

a second cooling unit for air-cooling the composite tubular synthetic resin hose with embedded tubular reinforcing member; and means for taking up said synthetic resin hose to a winding-up reel under a constant tension;

wherein said hollow cylindrical member has a tapered portion surrounded by the first heating unit for ensuring the smooth upward movement of said tubular reinforcing member along the outer peripheral surface of the hollow cylindrical member, the degree of taper being relating to the thermal shrinkage percentage of the braiding yarns used; and said member, said machine, said means and said units are arranged in the order described successively from one end of the hollow cylindrical member to said winding-up reel.

2. An apparatus for manufacturing a synthetic resin hose having a tubular reinforcing member embedded therein, comprising:

a plurality of bobbin creels for guiding warp material;

warp treating means for applying a bonding agent to said warp materials by means of a guide roller in a bonding agent tub;

a hollow cylindrical member having diameter adjusting discs provided with yarn guide holes for guiding a plurality of bonding agent warps to the outer peripheral surface of a hollow cylindrical member;

means for forming tubular member of warps parallely aligned in the tubular cross section by guiding warps through said yarn guide holes to the outer peripheral surface of the hollow cylindrical member;

a braiding machine body for weaving a plurality of braiding yarns into a braid member in overlying relation around the outer peripheral surface of said tubular warp member for preparing a tubular reinforcing member consisting of the tubular warp member and the braid member;

a heating unit surrounding the hollow cylindrical member for bonding the tubular warp member to the braided member at the contacts therebetween and for heat-setting said tubular reinforcing member;

an extrusion-molding machine body having molding die, nozzle, and manifold for coating fused synthetic resin onto the inner and outer peripheral surfaces of the reinforcing member, and an extruding machine connected to said manifold for extruding fused synthetic resin material;

a cooling unit for solidifying hose thus molded;

take-up means for taking up said synthetic resin hose to a winding up reel under a constant tension;

wherein said hollow cylindrical member, said forming means, said braiding machine, heating unit, extrusion-molding machine, cooling unit and take-up means are arranged in the order described successively from one end of the hollow cylindrical member to take-up means, and said hollow cylindrical member has a tapered portion surrounded by said heating unit for ensuring the smooth upward movement of said tubular reinforcing member along the outer peripheral surface of the hollow cylindrical member, the degree of taper being related to the thermal shrinkage percentage of the braiding yarns used.

* * * * *